United States Patent
Chen et al.

(10) Patent No.: US 8,775,039 B2
(45) Date of Patent: Jul. 8, 2014

(54) DYNAMICALLY ADJUSTABLE INCH/BRAKE OVERLAP FOR VEHICLE TRANSMISSION CONTROL

(75) Inventors: Chenyao Chen, Portland, OR (US); Kristian Ressler, Tigard, OR (US)

(73) Assignee: NMHG Oregon, LLC, Fairview, OR (US)

(*) Notice: Subject to any disclaimer, the term of this patent is extended or adjusted under 35 U.S.C. 154(b) by 1099 days.

(21) Appl. No.: 12/268,615

(22) Filed: Nov. 11, 2008

(65) Prior Publication Data

US 2009/0132134 A1    May 21, 2009

Related U.S. Application Data

(63) Continuation-in-part of application No. 11/516,913, filed on Sep. 6, 2006, now Pat. No. 7,974,760, which is a continuation of application No. PCT/US2005/021956, filed on Jun. 20, 2005, which is a continuation-in-part of application No. 10/689,812, filed on Oct. 20, 2003, now Pat. No. 6,950,737.

(60) Provisional application No. 60/580,988, filed on Jun. 18, 2004, provisional application No. 60/989,090, filed on Nov. 19, 2007.

(51) Int. Cl.
    *B60W 10/02*      (2006.01)
    *F16H 61/00*      (2006.01)

(52) U.S. Cl.
    USPC ............ 701/55; 701/70; 701/50; 701/51; 701/67; 701/95; 477/70; 477/71; 477/92; 477/169; 477/170; 477/172; 477/173; 477/174; 477/175; 477/180

(58) Field of Classification Search
    USPC .......... 701/70, 50, 51, 54, 67, 95; 477/71, 73, 477/92, 169, 171, 172, 173, 175, 180, 170, 477/174
See application file for complete search history.

(56) References Cited

U.S. PATENT DOCUMENTS

| | | | |
|---|---|---|---|
| 3,442,152 A | 5/1969 | Chana | |
| 3,893,552 A | 7/1975 | Dahl | |
| 4,129,148 A | 12/1978 | Lech | |

(Continued)

FOREIGN PATENT DOCUMENTS

| | | |
|---|---|---|
| DE | 3135055 | 4/1983 |
| DE | 4321413 | 1/1995 |

(Continued)

OTHER PUBLICATIONS

Cooksley, "Stepless Changes", IVT Int'l, Issue Feb. 2001, 3 pgs.

(Continued)

*Primary Examiner* — Adam Tissot
(74) *Attorney, Agent, or Firm* — Stolowitz Ford Cowger LLP

(57) ABSTRACT

A motorized vehicle includes a transmission system and an inch/brake device providing at least two ranges of motion. An engagement force of the transmission system is provided in a first range of motion of the inch/brake device, and a braking force of the motorized vehicle is provided in a second range of motion of the inch/brake device. An accelerator device moves between two or more positions, wherein moving the accelerator device from one position to another position causes an amount of overlap between the first and second ranges of motion of the inch/brake device to vary.

20 Claims, 8 Drawing Sheets

(56) References Cited

U.S. PATENT DOCUMENTS

| | | | |
|---|---|---|---|
| 4,144,863 A | 3/1979 | Abdoo | |
| 4,574,927 A | 3/1986 | Sturtz, Jr. | |
| 4,838,622 A | 6/1989 | Kircher et al. | |
| 5,048,655 A | 9/1991 | Seeba | |
| 5,568,378 A | 10/1996 | Wojsznis | |
| 5,833,210 A | 11/1998 | Sommer | |
| 5,868,214 A | 2/1999 | Workman | |
| 5,901,059 A | 5/1999 | Tao et al. | |
| 5,918,509 A | 7/1999 | Helig et al. | |
| 6,186,029 B1 | 2/2001 | McQuinn | |
| 6,335,609 B1 | 1/2002 | Amey et al. | |
| 6,424,902 B1 | 7/2002 | Kuras | |
| 6,684,148 B2 | 1/2004 | Chess | |
| 6,901,324 B2 | 5/2005 | Rose et al. | |
| 7,006,909 B1 | 2/2006 | May | |
| 7,146,263 B2 | 12/2006 | Guven et al. | |
| 7,153,235 B2 * | 12/2006 | Takamura et al. | 477/172 |
| 7,524,268 B2 * | 4/2009 | Oka et al. | 477/169 |
| 7,974,760 B2 * | 7/2011 | Rowley et al. | 701/70 |
| 2002/0107111 A1 | 8/2002 | Murakami | |
| 2003/0209047 A1 | 11/2003 | Nelepovita | |
| 2005/0245351 A1 | 11/2005 | Yamada et al. | |
| 2006/0293822 A1 | 12/2006 | Lattemann et al. | |
| 2007/0010927 A1 | 1/2007 | Rowley et al. | |
| 2007/0179017 A1 | 8/2007 | Yamada et al. | |

FOREIGN PATENT DOCUMENTS

| | | |
|---|---|---|
| EP | 0010950 | 5/1980 |
| EP | 0299235 | 1/1989 |
| EP | 1031487 | 8/2000 |
| EP | 1093986 | 10/2000 |
| EP | 1371513 | 12/2003 |
| FR | 2739064 | 3/1997 |
| GB | 663704 | 12/1951 |
| GB | 717868 | 11/1954 |
| GB | 730576 | 5/1955 |
| GB | 803667 | 10/1958 |
| GB | 807395 | 1/1959 |
| GB | 863815 | 3/1961 |
| GB | 931262 | 7/1963 |
| GB | 974481 | 11/1964 |
| GB | 1010876 | 11/1965 |
| GB | 1017626 | 1/1966 |
| GB | 1028889 | 5/1966 |
| GB | 1050283 | 12/1966 |
| GB | 1236040 | 6/1971 |
| GB | 1331352 | 9/1973 |
| GB | 1337712 | 11/1973 |
| GB | 1520100 | 4/1977 |
| GB | 2262818 | 6/1993 |
| GB | 2322457 | 8/1998 |
| JP | 4869951 | 12/1971 |
| JP | 1240350 | 9/1989 |
| JP | 3007625 | 1/1991 |
| JP | 03292456 | 12/1991 |
| JP | 4134141 | 5/1992 |
| JP | 4140567 | 5/1992 |
| JP | 4325733 | 11/1992 |
| JP | 06034027 | 2/1994 |
| JP | 06247190 | 6/1994 |
| JP | 11078617 | 3/1999 |
| JP | 2001116070 | 4/2001 |
| JP | 2002235846 | 8/2002 |
| JP | 2002363038 | 12/2002 |
| JP | 2002367299 | 12/2002 |
| JP | 2003182408 | 7/2003 |
| WO | 2005021315 | 3/2005 |

OTHER PUBLICATIONS

Dicks, "Drive through hydrostatics", IVT '99—Lift Truck & Materials Handling, pp. 65-68.
Failing, Braking in the Wet, IVT Int'l, 2002, pp. 117-118.
Meinke et al., "Breaking News", IVT Int'l, 2002, 4 pgs.
Scheffels, "Transmission: auto, manual or both", IVT Int'l, Issue Feb. 2000, 3 pgs.
Scheffels, "Hydraulics—the advantages of electronics", IVT Europe, Mar. 1998, 5 pgs.
Scheffels, "Electronics on the advance", IVT Europe, Issue 3, Jul. 1998, 5 pgs.
Taylor et al., "Electronic hydrostatics—the future of transmissions", IVT—Materials Handling, Jan. 1998, 3 pgs.
European Patent Office, European Search Report for EP08167535; Aug. 2, 2010.
European Patent Office, European Patent Application No. 05766042. 5, "Communication Pursuant to Article 94 (3) EPC", dated Apr. 10, 2012, 8 pages.
Stolowitz Ford Cowger LLP, "Corrected Listing of Related Cases", Jan. 9, 2012, 2 pages.
Stolowitz Ford Cowger LLP, "Listing of Related Cases", Dec. 13, 2011, 2 pages.
European Patent Office, Supplementary Search Report for EP05766042; Aug. 31, 2011, 3 pages.
European Patent Office, European Search Report for EP02255419.0, Apr. 1, 2004, 5 pages.
European Patent Office, Extended European Search Report for EP08000084.7, Feb. 21, 2008, 6 pages.
European Patent Office, Examination Report for EP02255419.0, Nov. 2, 2005, 4 pages.
European Patent Office, Supplemental Examination Report for EP02255419.0, Jul. 18, 2008, 4 pages.

* cited by examiner

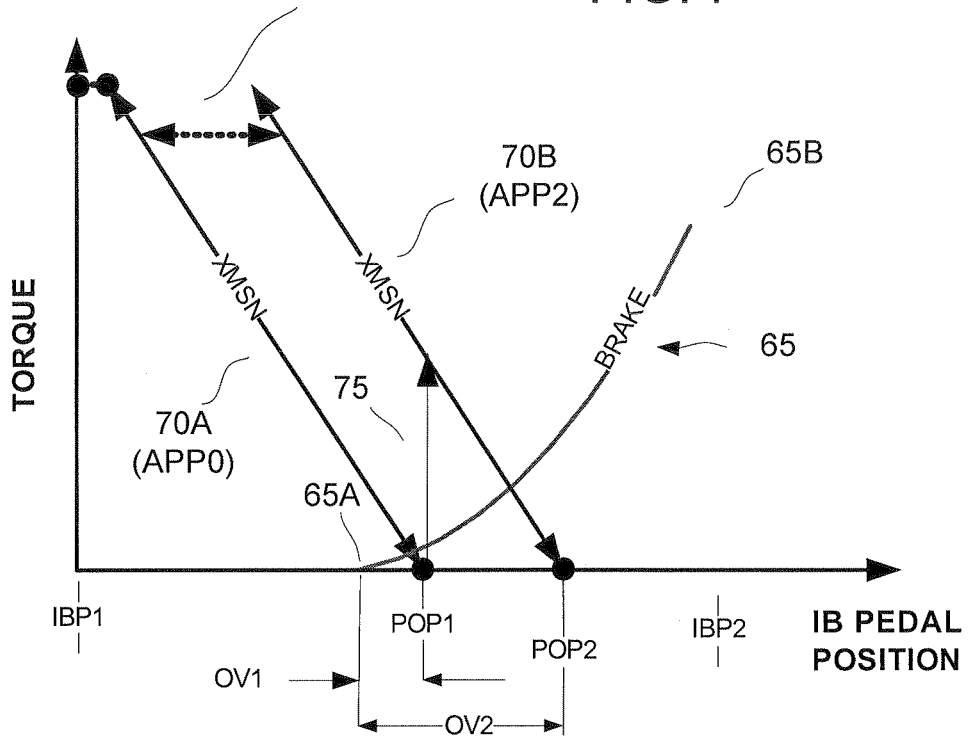
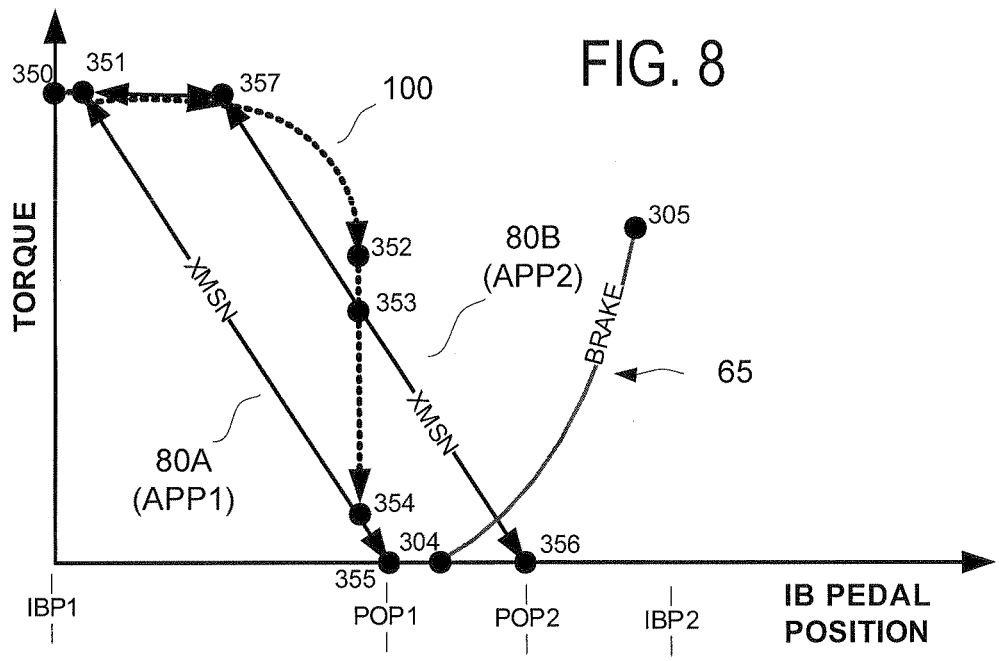

DYNAMICALLY ADJUSTABLE INCH/BRAKE OVERLAP FOR VEHICLE TRANSMISSION CONTROL

This application claims priority to U.S. Provisional Patent Application No. 60/989,090, filed on Nov. 19, 2007, which is incorporated by reference in its entirety, and is a continuation-in-part of U.S. patent application Ser. No. 11/516,913, filed on Sep. 6, 2006, now U.S. Pat. No. 7,974,760, which is a continuation of PCT Application No. PCT/US2005/021956, filed on Jun. 20, 2005, which claims priority to U.S Provisional Patent Application No. 60/580,988, filed on Jun. 18, 2004. PCT Application No. PCT/US2005/021956 further claims priority as a continuation-in-part to U.S. patent application Ser. No. 10/689,812, filed on Oct. 20, 2003, now U.S. Pat. No. 6,950,737.

BACKGROUND

Inching is the process by which an operator controls the slow forward or reverse travel movement of a motorized vehicle by the light application of clutch torque through the transmission. Certain industrial vehicles including materials handling vehicles or fork lift trucks, include a dual-purpose inch/brake pedal. The inch/brake pedal operates to engage a vehicle braking system, and also to engage a vehicle transmission. Typically the braking system is fully engaged when the inch/brake pedal is fully depressed, whereas the vehicle transmission is fully engaged when the inch/brake pedal is fully released. Inching occurs in an intermediate range of motion of the inch/brake pedal when the vehicle transmission is only partially engaged. Many industrial vehicles further include an accelerator pedal which is used to control the engine speed. The accelerator pedal has no effect on the clutch torque until the vehicle transmission is engaged.

The present state-of-the-art is to provide a fixed or manually adjustable amount of overlap of transmission drive torque to service brake torque according to the position of the inching/brake pedal alone or in combination with the service brake torque or brake pressure. This is known as inch/brake overlap. For vehicles that provide for adjustable overlap, a service technician manually adjusts the amount of overlap while the vehicle is being serviced. The amount of overlap is accordingly fixed at the adjusted amount during subsequent operation of the vehicle, until the overlap is once again manually adjusted by a service technician.

As operating conditions of the vehicle change from one operating shift to the next, or indeed during the same operating shift, the fixed amount of inch/brake overlap is well suited for some operations and not for others. For example, if the inch/brake overlap is manually set at a low value, this works well when the vehicle is operating on level surfaces. The operator is able to control vehicle inching satisfactorily under normal conditions. However this same low value does not work well when the vehicle is operating on an inclined surface, in which case the vehicle will roll down the hill when the brake pressure decreases too low without sufficient transmission force to maintain a position of the vehicle on, or to move the vehicle up, the grade. During loading or unloading operations on an incline, unintended vehicle movement down the grade may cause damage to the load being moved, or to other equipment or vehicles located adjacent the load.

If the inch/brake overlap is manually set at a high level for vehicle operations on an inclined surface, this will improve the hill holding operation of the vehicle. However, the high level of inch/brake overlap will result in an unnecessary buildup of heat in the transmission and braking systems as they work against each other. This results in more frequent and expensive vehicle maintenance requirements, and is undesirable when the primary application of the vehicle is on a level operating surface. Inching operation of the vehicle when the inch/brake overlap is high also affects the degree of fine controllability of the vehicle, tending to cause the vehicle to lurch or operate unevenly.

The present invention addresses these and other problems.

SUMMARY OF THE INVENTION

A motorized vehicle is disclosed herein, as comprising a transmission system and an inch/brake device configured to provide at least two ranges of motion. An engagement force of the transmission system is provided in a first range of motion of the inch/brake device, and a braking force of the motorized vehicle is provided in a second range of motion of the inch/brake device. An accelerator device is configured to move between two or more positions, wherein moving the accelerator device from one position to another position causes an amount of overlap between the first and second ranges of motion of the inch/brake device to vary.

An inching control system is disclosed herein, as comprising an accelerator pedal position (APP) sensor and an inch/brake pedal position (IBPP) sensor. A vehicle processor is configured to selectively engage a transmission system or a vehicle braking system according to input received from the IBPP sensor. The vehicle processor is further configured to vary an amount of transmission engagement force associated with a single vehicle braking force value in an inch/brake overlap region of the inching control system according to input received from the APP sensor.

A method is disclosed herein, comprising monitoring an inch/brake device input and reducing a vehicle braking torque according to the inch/brake device input. The method further comprises monitoring an accelerator input and modifying an inch/brake overlap region according to the accelerator position input. The inch/brake overlap region is associated with simultaneous engagement of both a vehicle transmission system and a vehicle braking system The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 illustrates a simplified block diagram of system comprising a controller configured to provide a dynamically adjustable inch/brake overlap.

FIG. 7 is a further example diagram illustrating inching control with dynamically adjustable inch/brake overlap.

FIG. 8 is an example diagram illustrating inching control with dynamically adjustable inch/brake overlap.

DETAILED DESCRIPTION

Figure 2A:
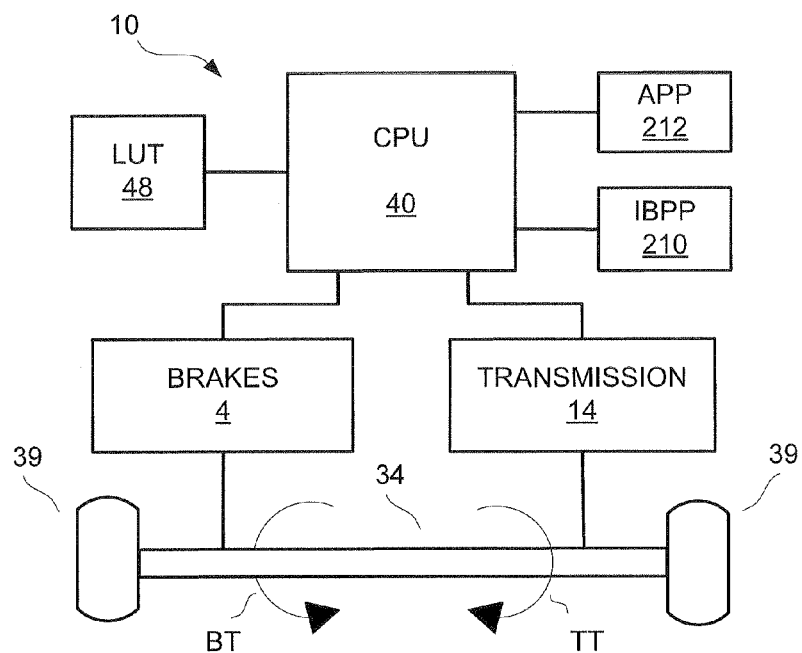
FIG. 2A illustrates a simplified example inch/brake pedal.

FIG. 1 illustrates a simplified block diagram of an inching control system 10 comprising a controller 40 configured to provide a dynamically adjustable inch/brake overlap. The inching control system enhances inching control functionality by using acceleration pedal position (APP) to dynamically adjust or automatically vary the overlap of transmission driving torque with the service brake torque. Dynamically adjusting the relationship between transmission torque and brake torque provides the operator maximum controllability of vehicle positioning and inching operations in a variety of applications.

The inching control system 10 includes an APP sensor 212, and an inch/brake pedal position (IBPP) sensor 210. The controller 40 may comprise a vehicle processor, wherein the controller 40 is configured to selectively engage a transmission control system 14 or a vehicle braking system 4 according to input received from the IBPP sensor 210. The controller 40 is further configured to vary an amount of transmission engagement force or transmission torque TT associated with a single vehicle braking force value in an inch/brake overlap region of the inching control system 10 according to input received from the APP sensor 212.

In one embodiment, the transmission control system 14 and the vehicle braking system 4 are simultaneously engaged within the inch/brake overlap region. This results in simultaneous application of the transmission torque TT and a braking torque BT to a vehicle drive axle 34. The drive axle 34 may comprise two or more drive wheels 39. The braking torque BT may be understood as operating in an opposite direction as the transmission torque TT, as the braking torque BT resists a rotation of the drive axle 34 due to the rotational force of the transmission torque TT.

FIG. 2A illustrates a simplified example inch/brake pedal 43, shown in multiple operating positions. The inch/brake pedal 43 is shown mounted to, or otherwise located on, a cowl or operating platform 25 of a vehicle, however inch/brake pedal 43 may be located in any position or location within an operator compartment. In one embodiment, inch/brake pedal 43 pivots about an approximately horizontal axis to form varying angles or ranges of motion with respect to the operating platform 25.

The inch/brake pedal 43 illustrated in FIG. 2A is shown in solid lines at a fully released position IBP1. The inch/brake pedal 43 may include a return spring or other device that causes the inch/brake pedal 43 to remain or return to the released position IBP1 anytime that an operator removes their foot from, or ceases to apply a minimum amount of force against, the inch/brake pedal 43. At the fully released position IBP1, the inch/brake pedal 43 is associated with an input from the IBPP sensor 210 (FIG. 1) that corresponds to a full engagement of the transmission control system 14. Various partially and fully depressed positions POP1, POP2, IBP2 of the inch/brake pedal 43 are shown as dashed lines. One skilled in the art will appreciate that partially depressed positions POP1, POP2 represent only two of the many possible positions that the inch/brake pedal 43 may be located at, intermediate the fully released position IBP1 and the fully depressed position IBP2.

The fully depressed position IBP2 of the inch/brake pedal 43 is associated with an input from the IBPP sensor 210 that corresponds to a full engagement of the braking system 4 (FIG. 1), wherein the transmission control system 14 (FIG. 1) is fully disengaged. One or more of the partially depressed positions POP1, POP2 correspond to a range of motion of the inch/brake pedal 43 that provides inch/brake overlap.

Figure 2B:
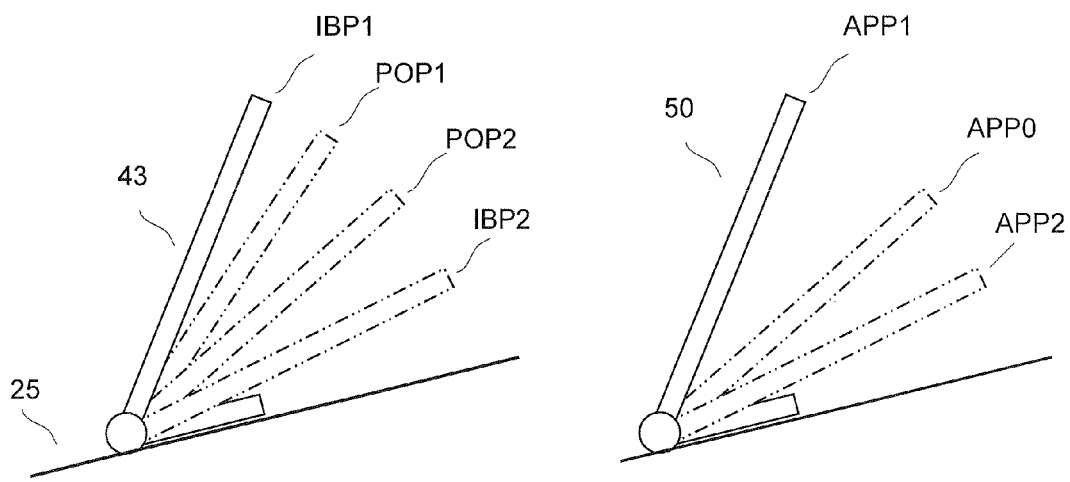
FIG. 2B illustrates a simplified example accelerator pedal.

FIG. 2B illustrates a simplified example accelerator pedal 50, shown in multiple operating positions. The accelerator pedal 50 is shown mounted to, or otherwise located on, a cowl or operating platform 25 of a vehicle, however accelerator pedal 50 may be located in any position or location within an operator compartment. In one embodiment, accelerator pedal 50 pivots about an approximately horizontal axis to form varying angles or ranges of motion with respect to the operating platform 25.

The accelerator pedal 50 illustrated in FIG. 2B is shown in solid lines at a released position APP1. The accelerator pedal 50 may include a return spring or other device that causes the accelerator pedal 50 to remain or return to the fully released position APP1 anytime that an operator removes their foot from, or ceases to apply a minimum amount of force against, the accelerator pedal 50. At the fully released position APP1, the accelerator pedal 50 is associated with an input from the APP sensor 212 (FIG. 1) that corresponds to a zero or minimum request for vehicle speed, or a minimum engine speed, depending on the type of vehicle transmission.

Various partially and fully depressed positions APP0, APP2 of the accelerator pedal 50 are shown as dashed lines. One skilled in the art will appreciate that partially depressed position APP0 represents only one of the many possible positions that the accelerator pedal 50 may be located at, intermediate the fully released position APP1 and the fully depressed position APP2. The partially depressed positions APP0 of the accelerator pedal 50 is associated with an input from the APP sensor 212 that corresponds to an intermediate request for vehicle speed, or an intermediate engine speed, depending on the type of vehicle transmission.

The fully depressed position APP2 of the accelerator pedal 50 is associated with an input from the APP sensor 212 that corresponds to a maximum request for vehicle speed, or a maximum engine speed, depending on the type of vehicle transmission. In one embodiment, the accelerator pedal 50 provides speed-based accelerator pedal position functionality, wherein a different vehicle speed is associated with each position or angle of the accelerator pedal 50, independent of the engine speed.

In some transmission control systems, the position of the accelerator pedal sets a target travel speed. Transmission torque is controlled in combination with engine rpm to deliver the target travel speed regardless of load or grade. The Transmission Control System illustrated in FIGS. 1 and 3 operates similarly as described in U.S. Pat. No. 6,950,737 to Robert Lee Chess, filed Oct. 20, 2003 and entitled "Transmission Control System", the specification of which is incorporated by reference in its entirety.

Inch/brake pedal 43 and accelerator pedal 50 may be understood to comprise one or more pedals, buttons, joysticks, toggles, switches, or any other operating control known in the art. Any reference to pressing, depressing or otherwise changing a location or position of the pedals 43, 50 may be understood to be provided by operations of twisting, rotating, flipping, selecting, toggling, switching, or otherwise actuating the inching, braking, or acceleration devices providing the same or similar functionality as pedals 43, 50.

Figure 3:
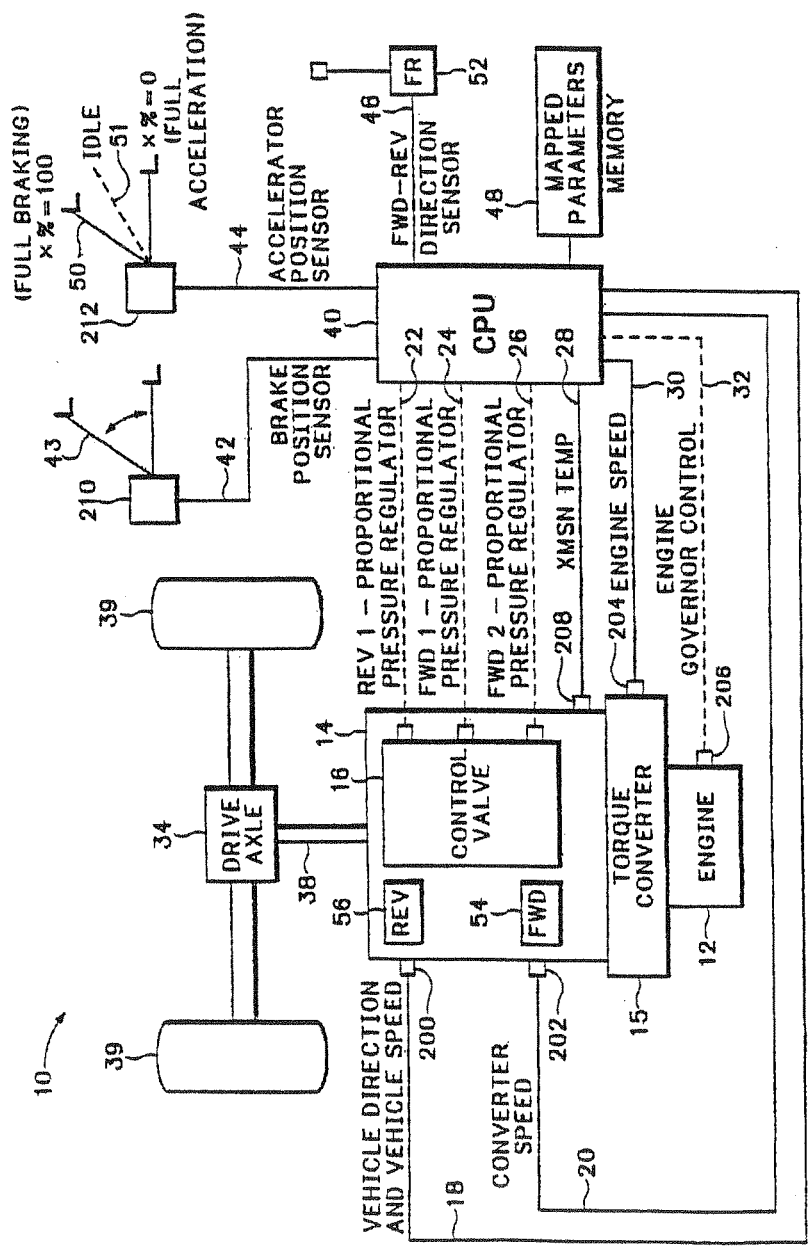
FIG. 3 illustrates an example block diagram of a transmission control system for a power shift transmission.

FIG. 3 illustrates an example block diagram of a transmission control system 14. Transmission control system 14 is connected to an engine 12 by a hydraulic torque converter 15. An output shaft 38 of the transmission control system 14 is connected to a drive axle 34 that drives wheels 39. In one example, the transmission control system 14 is used in a fork lift truck. However, the transmission control system 14 can also be used in other types of vehicles.

A Central Processing Unit (CPU) or controller 40 controls the activation of a forward clutch pack (FWD) 54 and a reverse clutch pack (REV) 56 in the transmission control system 14 according to different vehicle parameters. A control valve 16 in the transmission control system 14 controls fluid pressure that activates the two clutch packs 54 and 56.

The controller 40 receives a vehicle speed and direction signal 18 from a vehicle speed sensor 200 indicating the rotational speed and direction of the drive axle 34. A converter speed signal 20 is generated from a torque converter speed sensor 202 and indicates the rotational speed for a shaft 17 (FIG. 4) of the torque converter 15. An engine speed signal 30 is generated from an engine speed sensor 204 and indicates how fast an output shaft 13 (FIG. 4) of the engine 12 is rotating. An engine governor control signal 32 controls the speed of engine 12. A transmission temperature signal 28 is generated from a temperature sensor 208 and indicates the temperature of the transmission fluid in the torque converter 15 or transmission control system 14.

Figure 4:
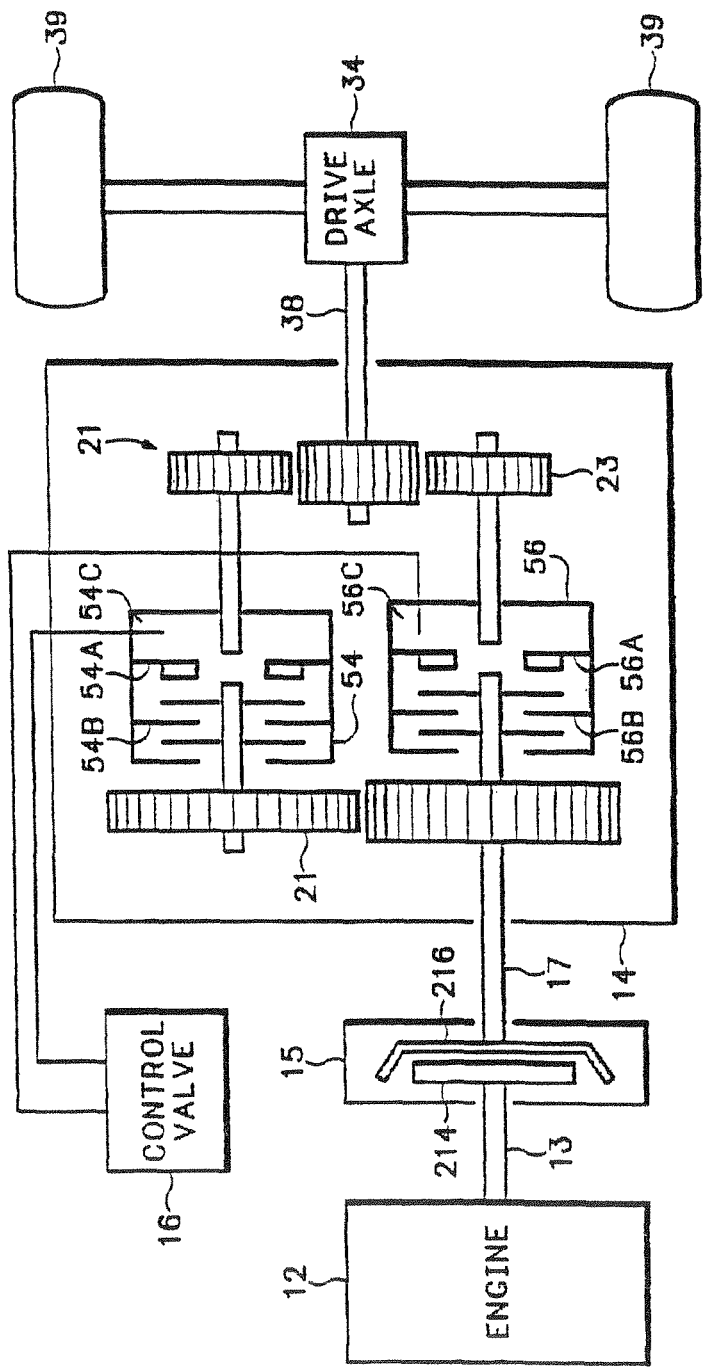
FIG. 4 illustrates a further block diagram of the power shift transmission of FIG. 3.

FIG. 4 illustrates a further block diagram of the transmission control system 14 of FIG. 3. In one embodiment, the transmission control system 14 comprises a powershift transmission. The inching control system of FIG. 1 may operate with a single speed powershift transmission, a multi-speed powershift transmission, or any other combination of gears, for performing the braking and inching operations described herein.

The torque converter 15 includes an impeller pump 214 and a turbine 216. A shaft 13 extends from the impeller pump 214 and is coupled to the crankshaft of engine 12. Shaft 17 extends from the turbine 216 and is coupled to the input of transmission control system 14. The torque converter 15 continuously varies the ratio of the speed of the shaft 17 to the speed of the shaft 13 in accordance with the load on the shaft 17.

The forward clutch 54 and the reverse clutch 56 each selectively engages and disengages the shaft 17 with shaft 38 through the forward gears 21 and reverse gears 23. The engaging force of the clutches 54 and 56 is controlled by changing the oil pressure in oil chambers 54C and 56C, respectively. The oil pressures are controlled by the control valve 16 which is controlled by the controller 40 (FIG. 3). The clutches 54 and 56 in one embodiment are multiple disk hydraulic wet clutches.

When the clutch pressures are both zero, the clutches 54 and 56 disconnect the shaft 38 from the shaft 17. When the clutch pressure for either of the clutch packs is at a maximum pressure, the corresponding clutch pack maximizes the engaging force (locking). When the clutch pack pressure is between zero and the maximum value, the corresponding clutch pack is partially engaged. The partially engaged condition is referred to as clutch pack slipping. A FWD-1 signal 24 in FIG. 3 controls the oil pressure in the forward clutch 54. A REV-1 signal 22 in FIG. 3 controls the oil pressure in the reverse clutch 56. A FWD-2 signal 26 controls the oil pressure in the forward high clutch (not shown).

The controller 40 receives a brake pedal position signal 42 from the IBPP sensor 210 on inch/brake pedal 43. An accelerator pedal position signal 44 is received from the APP sensor 212 on accelerator pedal 50. The accelerator pedal position can alternatively refer to a throttle value, acceleration value, deceleration value, engine speed value, engine torque value, or a target vehicle travel speed value. A forward-reverse direction signal 46 is generated by a direction sensor 52 and indicates a forward or backward direction the vehicle operator selects for the vehicle. An internal or external memory 48 contains mapped parameters identifying clutch pack pressure values and other control parameters used for performing different braking operations.

Figure 5:
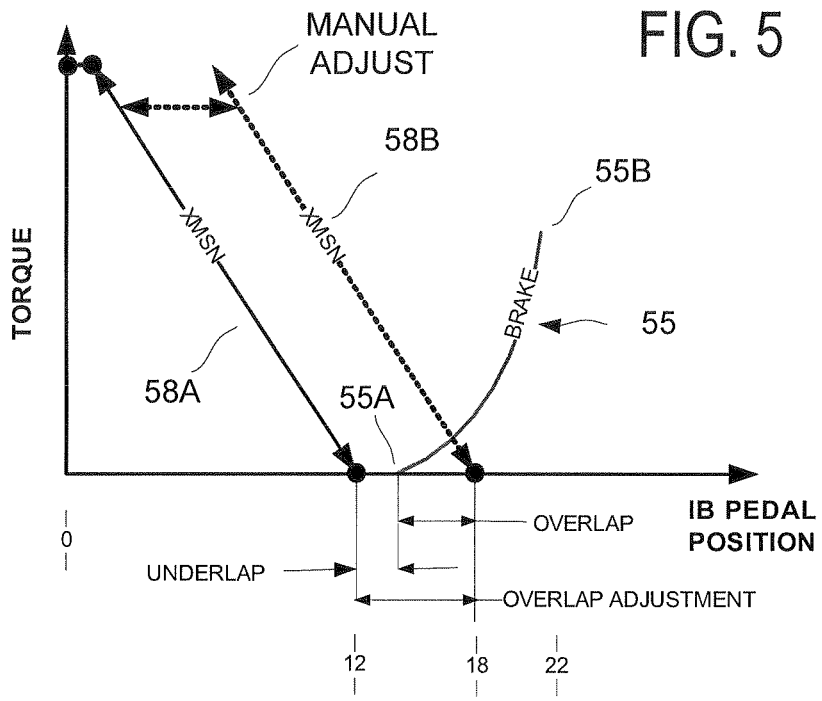
FIG. 5 is a diagram illustrating inching control with a manually adjusted fixed inch/brake overlap.

FIG. 5 is a diagram illustrating inching control with manually adjusted, fixed inch/brake overlap. The vertical axis of the diagram represents an amount of torque provided by a transmission system and a braking system, respectively. The horizontal axis of the diagram represents a position or angle of an inch/brake pedal.

A low transmission torque curve 58A illustrates an amount of clutch torque actuated according to the inch/brake pedal position. At a zero degrees inch/brake pedal position at the left-hand side of the diagram, the low transmission torque curve 58A is at a maximum value (e.g. the transmission is fully engaged). As the inch/brake pedal position moves from zero degrees through a first range of motion (illustrated as being from zero to approximately twelve degrees), the transmission torque value decreases from the maximum value to zero torque. At zero torque, the transmission control system becomes disengaged, such that the vehicle engine is unable to provide any acceleration to the vehicle.

Brake torque curve 55 illustrates an amount of brake torque applied according to the inch/brake pedal position. At a first braking position 55A, the brake torque curve 55A is at a minimum value (e.g. the brakes are beginning to engage). The first braking position 55A is shown as occurring at approximately fourteen degrees, for illustrative purposes only. As the inch/brake pedal position moves from the first braking position 55A through a second range of motion including a second braking position 55B, the brake torque value increases from the minimum brake torque value to a maximum brake torque value. The second braking position 55B is shown as occurring at approximately twenty two degrees, for illustrative purposes only.

As the inch/brake pedal is moved from the first range of motion associated with the low transmission torque curve 58A to the second range of motion associated with the brake torque curve 55, the transmission system becomes disengaged and the braking system becomes engaged. There is no inch/brake overlap between the low transmission torque curve 58A and the brake torque curve 55, rather this region is referred to as underlap. In the underlap region, the vehicle may coast according to any inertia or gravitational forces acting on it, there being no transmission or brake torque being applied to the vehicle drive axle. For certain applications involving operating the vehicle on relatively flat surfaces, this may be acceptable or desirable performance. However, where the vehicle is being operated on an incline, this may result in inadvertent movement of the vehicle prior to or during inching operations.

The torque curve may be manually shifted by a service technician, for example, to be fixed at a high transmission torque curve 58B. The high transmission torque curve 58B also illustrates an amount of clutch torque actuated according to the inch/brake pedal position. At a zero degrees inch/brake pedal position at the left-hand side of the diagram, the high transmission torque curve 58B is at a maximum value (e.g.

the transmission is fully engaged). As the inch/brake pedal position moves from zero degrees through a first range of motion (illustrated as being from zero to approximately eighteen degrees), the transmission torque value decreases from the maximum value to zero torque.

As discussed with respect to the low transmission torque curve 58A, when the high transmission torque curve 58B reaches zero torque the transmission control system also becomes disengaged, such that the engine is unable to provide any acceleration to the vehicle. After the manual adjustment of the transmission torque curve, however, an inch/brake overlap provides an operating condition where the transmission system and the braking system both provide torque to the drive axle. As a result, by the time the high transmission torque curve 58B reaches zero, the braking torque curve 55 has increased to a non-trivial amount that may be sufficient to provide a certain degree of hill holding capability for the vehicle.

If the vehicle is then once again operated on a flat surface, the fixed high transmission torque curve 58B will continue to apply the same inch/brake overlap region which results in excessive heating of the transmission and braking system, and may also affect inching control of the vehicle. However, in order to revise the inching control system back to the low transmission torque curve 58A, the service technician once must again work on the vehicle to manually adjust the inch/brake overlap.

Figure 6:
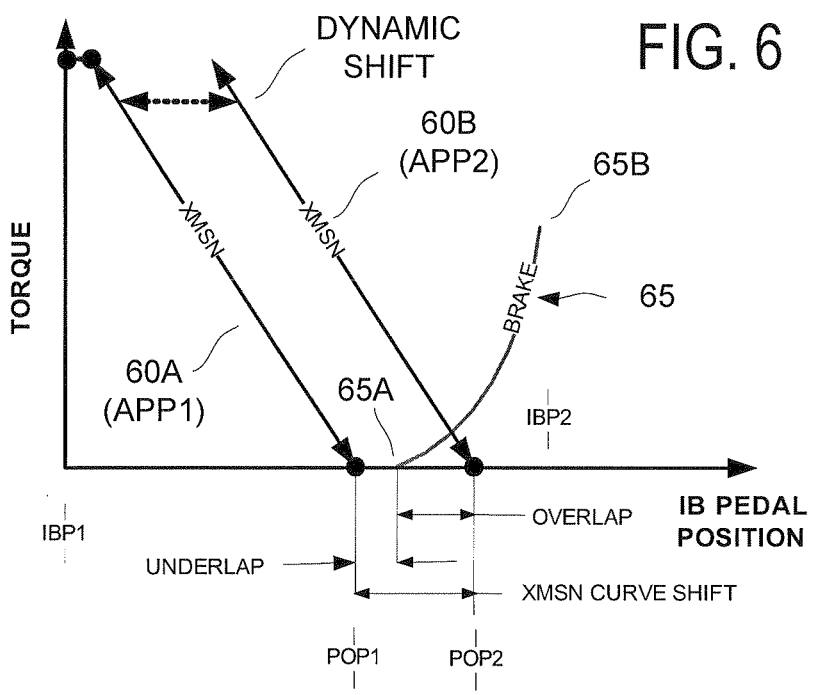
FIG. 6 is an example diagram illustrating inching control with dynamically adjustable inch/brake overlap.

FIG. 6 is an example diagram illustrating inching control with dynamically adjustable inch/brake overlap. The vertical axis of the diagram represents an amount of torque provided by the transmission system 14 and the braking system 4 of FIG. 1, respectively. The horizontal axis of the diagram represents a position or angle of an inch/brake pedal, such as inch/brake pedal 43 of FIG. 2A.

A first transmission torque curve 60A illustrates an amount of clutch torque actuated associated with the fully released accelerator pedal position APP1 of FIG. 2B. The first transmission torque curve 60A may be understood as being operable provided the accelerator pedal 50 (FIG. 2B) is held or maintained at the fully released pedal position APP1. At the fully released inch/brake pedal position IBP1 (FIG. 2A) at the left-hand side of the diagram, the first transmission torque curve 60A is at a maximum value. As the inch/brake pedal position moves from the fully released pedal position IBP1 through a first range of motion including partially pressed pedal position POP1 (FIG. 2A), the transmission torque value decreases from the maximum value to zero torque.

Brake torque curve 65 illustrates an amount of brake torque actuated according to the inch/brake pedal position. At a first braking position 65A, the brake torque curve 65 is at a minimum value. As the inch/brake pedal position moves from the first braking position 65A through a second range of motion including a second braking position 65B, the brake torque value increases from the minimum brake torque value to a maximum brake torque value.

As the inch/brake pedal 43 (FIG. 2A) is moved from the first range of motion associated with the first transmission torque curve 60A to the second range of motion associated with the brake torque curve 65, the transmission system 14 (FIG. 1) becomes disengaged and the braking system 4 (FIG. 1) becomes engaged. The region between the first transmission torque curve 60A and the brake torque curve 65 as illustrated in FIG. 6 identifies inch/brake underlap. Inch/brake underlap is indicated when the input received from the accelerator pedal position sensor 212 (FIG. 1) indicates zero vehicle acceleration, and wherein neither the transmission system 14 nor the braking system 4 are engaged.

In one embodiment, only one of the transmission system 14 or the braking system 4 is engaged when the inching control system 10 is outside of the inch/brake overlap region. For example, when the position of the inch/brake pedal 43 is between pedal position IBP1 and POP1, only the transmission system 14 is engaged. When the position of the inch/brake pedal 43 is between pedal positions 65A and IBP2, and an inch/brake underlap condition exists, only the brake system 4 is engaged.

The torque curve may be dynamically adjusted or shifted between the first transmission torque curve 60A and a second transmission torque curve 60B, according to a position of the accelerator pedal 50 (FIG. 2B). The second transmission torque curve 60B is associated with the fully pressed accelerator pedal position APP2 (FIG. 2B). The second transmission torque curve 60B may be understood as being operable provided the accelerator pedal 50 (FIG. 2B) is held or maintained at the fully pressed accelerator pedal position APP2.

The second transmission torque curve 60B also illustrates an amount of clutch torque actuated according to the inch/brake pedal position. At the released inch/brake pedal position IBP1 at the left-hand side of the diagram, the second transmission torque curve 60B is at a maximum value. As the inch/brake pedal 43 moves from the released pedal position IBP1 through a first range of motion including partially pressed pedal position POP2 (FIG. 2A), the transmission torque value decreases from the maximum value to zero torque. In the embodiment illustrated by FIG. 6, the inch/brake overlap region exists as a function of actuating both the brake pedal 43 and the accelerator pedal 50 at the same time. Simultaneously pressing the inch/brake pedal 43 and the accelerator pedal 50 causes the transmission driving torque to be available before the brake torque is released.

An inch/brake overlap is illustrated as occurring between the brake torque curve 65 and the second transmission torque curve 60B. The inch/brake overlap may be understood to exist between the inch/brake pedal position 65A and the inch/brake pedal position POP2, wherein pedal position POP2 indicates that the inch/brake pedal 43 has been pressed further than indicated by pedal position 65A. The inch/brake overlap region provides an operating condition where the transmission system 14 and the braking system 4 both simultaneously provide torque to the drive axle 34 for the same position, or range of positions, of the inch/brake pedal 43.

The inch/brake overlap region varies according to input received from the accelerator pedal position sensor 212 (FIG. 1). In one embodiment, the inch/brake overlap region is largest when the input received from the accelerator pedal position sensor 212 indicates a request for maximum vehicle travel speed. On the other hand, the inch/brake overlap region may be smallest when the input received from the accelerator pedal position sensor 212 indicates a request for zero vehicle travel speed.

FIG. 7 is a further example diagram illustrating inching control with dynamically adjustable inch/brake overlap. A motorized vehicle may comprise a transmission system, such as transmission system 14 (FIG. 1), and an inch/brake device, such as inch/brake pedal 43 (FIG. 2A) configured to provide at least two ranges of motion. The first range of motion may include a position of the inch/brake pedal 43 between pedal positions 65A and 65B. A braking force of the motorized vehicle is provided in the first range of motion of the inch/brake pedal 43. The second range of motion may include a position of the inch/brake pedal 43 between pedal positions IBP1 and POP1 or POP2. An engagement force of the transmission system 14 is provided in the second range of motion of the inch/brake pedal 43.

The motorized vehicle may further comprise an accelerator device, such as accelerator pedal 50 (FIG. 2B) configured to be moved between two or more positions. In one embodiment, moving the accelerator pedal 50 from one position to another position causes an amount of overlap between the first and second ranges of motion of the inch/brake pedal 43 to vary.

The inch/brake pedal 43 may be configured to simultaneously provide both the braking force of the motorized vehicle and the engagement force of the transmission system 14 when the first and second ranges of motion of the inch/brake pedal 43 overlap. The overlap between the first and second ranges of motion of the inch/brake device exists when the position of the accelerator pedal 50 indicates a request for non-zero acceleration.

FIG. 7 further illustrates an intermediate transmission torque curve 70A associated with an intermediate, or partially pressed position APP0 of the accelerator pedal 50. The intermediate transmission torque curve 70A overlaps with the brake torque curve 65, as identified by a first overlap region OV1. First overlap region OV1 provides for a reduced amount of transmission torque for a fixed or selected position of the inch/brake pedal 43, for example inch/brake pedal position POP1.

Second transmission torque curve 70B is associated with the fully pressed position APP2 of the accelerator pedal 50. The second transmission torque curve 70B overlaps with the brake torque curve 65, as identified by a second overlap region OV2. The region identified by the second overlap region OV2 is larger than, and includes the region identified by, the first overlap region OV1. The engagement torque of the transmission system 14 varies as the amount of overlap varies, wherein the braking force of the motorized vehicle remains constant, for a single or select position of the inch/brake pedal 43. For example, the transmission torque associated with the second transmission curve 70B is greater than the transmission torque associated with the intermediate torque curve 70A, for the same position POP1 of the inch/brake pedal 43.

In one embodiment, the accelerator pedal position may be made to vary, for example between accelerator pedal position APP0 and APP2, in order to vary an amount of transmission torque for the selected position of the inch/brake pedal. By way of example, when the vehicle is being operated on an incline, the operator may initially press the accelerator pedal 50 to position APP0 while simultaneously pressing the inch/brake pedal 43 to position POP1. Depending on the angle of slope or grade that the vehicle is operating on, the amount of braking force or braking torque associated with inch/brake pedal position POP1 may be sufficient to keep the vehicle from rolling down the hill. For steeper grades, the braking torque may not be sufficient to hold the vehicle. Similarly, the transmission torque associated with transmission torque curve 70A may not be sufficient to propel or accelerate the vehicle up the grade.

By pressing the accelerator pedal 50 to accelerator pedal position APP2, inch/brake overlap region dynamically increases and results in an increase in transmission torque associated with the transmission torque curve 70B without increasing the engine speed. This is shown in FIG. 7 by the upward trending transmission torque change 75. The increase of transmission torque may therefore cause the vehicle to accelerate up the steep incline without first rolling in the opposite direction. The position of the accelerator pedal 50 may be varied to any position intermediate pedal positions APP0 and APP 2, and for that matter between APP1 and APP2 to incrementally vary the amount of inch/brake overlap and corresponding change in transmission torque.

FIG. 8 is an example diagram illustrating inching control with dynamically adjustable inch/brake overlap, and the interaction of the accelerator pedal 50 (FIG. 2B) and the inch/brake pedal 43 (FIG. 2A). Inch/brake pedal position 42 (FIG. 3) corresponds to brake torque curve 65. The brake torque curve 65 may correspond with the braking torque provided by a service brake. The relationship between a inch/brake pedal position 42 and the brake torque is plotted on the brake torque curve 65. As the inch/brake pedal 43 is pressed, a point is reached where brake torque begins 304.

Transmission driving torque is used to move the vehicle. If the inch/brake pedal 43 is released at inch/brake position IBP1, it corresponds to a maximum transmission driving torque at point 350. As the inch/brake pedal 43 is pressed, the transmission driving torque begins to be reduced during speed control 100. The first inching transmission torque curve 80A associated with the released accelerator pedal position APP1 (FIG. 2B) is plotted against the inch/brake pedal position.

Speed control 100 remains in effect until point 352. Point 352 may correspond to a partially pressed inch/brake pedal position which is less than inch/brake pedal position POP1. In one embodiment, point 352 is associated with an inch/brake position of approximately ten degrees, whereas inch/brake position POP1 is approximately twelve degrees. The transmission driving torque of speed control 100 is a function of accelerator pedal position 44 (FIG. 3), inch/brake pedal position 42, engine speed 30 (FIG. 3), speed of the shaft 17 (FIG. 4), the target vehicle travel speed, and the actual vehicle travel speed and direction 18 (FIG. 3).

Inching Control with No Accelerator Pedal Pressed

At point 352, if the accelerator pedal 50 is at APP1 (FIG. 2B), then the transmission driving torque drops to a lower level indicated by point 354. Then as the inch/brake pedal position 42 increases further to partially pressed inch/brake pedal position POP1, the transmission driving torque continues to drop to zero at point 355. At point 355, inch/brake underlap exists. When the inch/brake pedal position 42 reaches point 304, the brake torque begins to increase according to brake torque curve 65.

If the inch/brake pedal position 42 is then steadily decreased from a point on the brake torque curve 65 towards the partially pressed inch/brake pedal position POP1, the transmission driving torque will begin to increase at point 355 and follow the first inching transmission torque curve 80A upward and to the left to point 351. At point 351, the inching control transitions back to speed control 100.

Inching Control with Accelerator Pedal Pressed

At point 352, if the accelerator pedal 50 is pressed, then the transmission driving torque drops to a lower level indicated by point 353 on the second inching torque curve 80B associated with accelerator pedal position APP2 (FIG. 2B). Then as the inch/brake pedal position 42 increases further towards partially pressed inch/brake pedal position POP2, the transmission driving torque continues to drop along the second inching torque curve 80B to zero at point 356. At point 356, inch/brake overlap exists. At this point, a vehicle will feel like it is driving against the service brakes during inch/brake overlap.

As the inch/brake pedal position 42 continues to increase towards the fully pressed inch/brake pedal position IBP2, brake torque begins to increase according to the brake torque curve 65. If the inch/brake pedal position 42 is then steadily decreased from a point on the brake torque curve 65 towards the partially pressed inch/brake pedal position POP2, the transmission driving torque will increase from point 356 to point 357 and follow the second inching torque curve 80B that was shifted by pressing the accelerator pedal 50. In one embodiment, the amount of shift of the inching torque curve is proportional to an amount that the accelerator pedal 50 is pressed. At point 351, the inching control transitions back to speed control 100.

If the transmission driving torque is equal to zero before the brake torque begins to rise, then inch/brake underlap exists. If the transmission driving torque is greater than zero after the brake torque begins to rise, then inch/brake overlap exists. If the accelerator pedal 50 is pressed while inching control is in effect, then the first inching transmission torque curve 80A undergoes a dynamic shift to the right to the second inching transmission torque curve 80B. This has the affect of dynamically increasing the inch/brake overlap region. This is useful for starting on a grade, and helps prevent the vehicle rolling back down the hill during starting or inching.

Figure 9:
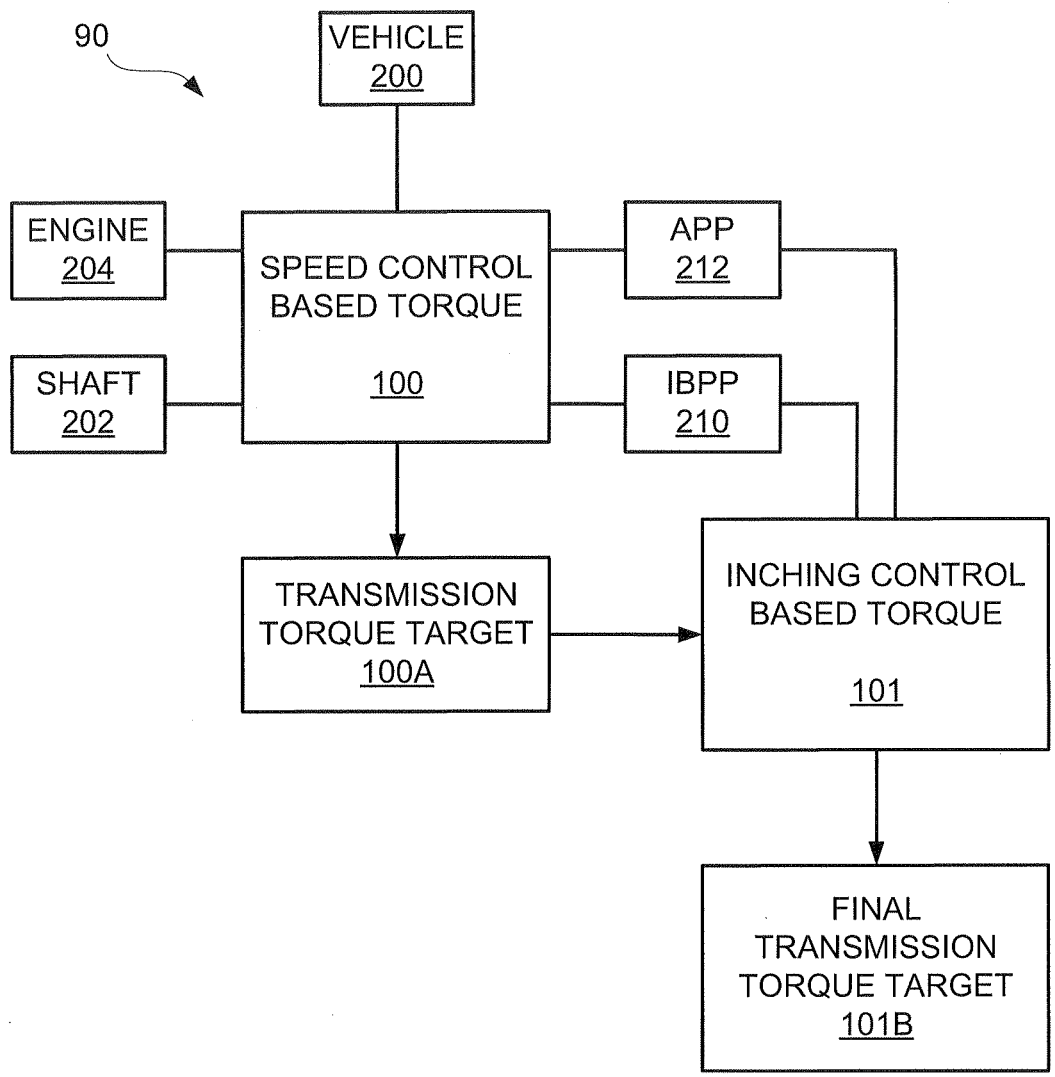
FIG. 9 is an example block diagram illustrating a process of determining transmission torque for an accelerator pedal based speed control system.

FIG. 9 is an example block diagram illustrating a system or process 90 of determining transmission torque for an accelerator pedal based speed control system. Process 90 comprises several applications, including a speed control based torque application 100 and an inching control based torque application 101. Applications 100 and 101 may be implemented in software or hardware, and in one embodiment, operations performed by one or more of the applications 100 and 101 are performed by controller 40 of FIG. 1.

Speed control based torque application 100 determines transmission torque target 100A. Speed control based torque application 100 receives input from a number of different components or sensors to determine the transmission torque target 100A. Input may be received from one or more of the vehicle speed sensor 200, the engine speed sensor 204, the torque converter shaft speed sensor 202, the APP sensor 212, and the IBPP sensor 210 (see FIGS. 1 and 3). The transmission torque target 100A may be determined as a function of the input from one or more of the sensors 200, 202, 204, 210, 212.

In one embodiment, a target travel speed is first determined as a function of input from APP sensor 212 and IBPP sensor 210. Next, the transmission torque target 100A is determined as a function of the target travel speed, and input from the vehicle speed sensor 200, engine speed sensor 204, and torque converter output shaft speed sensor 202.

The inching control based torque application 101 (see also FIG. 8) determines final transmission torque target 101B. During an inching operation, final transmission torque target 101B is determined as a function of the transmission torque target 100A, and input from the APP sensor 212 and the IBPP sensor 210. A look up table (LUT), such as LUT 48 of FIG. 1, or a modified algorithm may be used in addition to, or in place of, the computations or functions described herein.

The process 90 of determining transmission torque may be configured to dynamically increase transmission torque with braking torque, also known as inch/brake overlap, according to input received from the accelerator pedal 50 (FIG. 2B) and the inch/brake pedal 43 (FIG. 2A). Additional features of the one or more embodiments described herein are as follows:

Brake pedal position schedules the transmission driving torque.
  Acceleration pedal position increases inching overlap function by shifting the inch/brake schedule of transmission driving torque to the right.
  Opposite clutches of the transmission system are slipped at low desired drive torque to provide smooth engagement of torque.
  The starting inch/brake overlap relationship may be adjusted manually or electrically, so that more or less transmission torque corresponds to a fixed level of braking torque.

Figure 10:
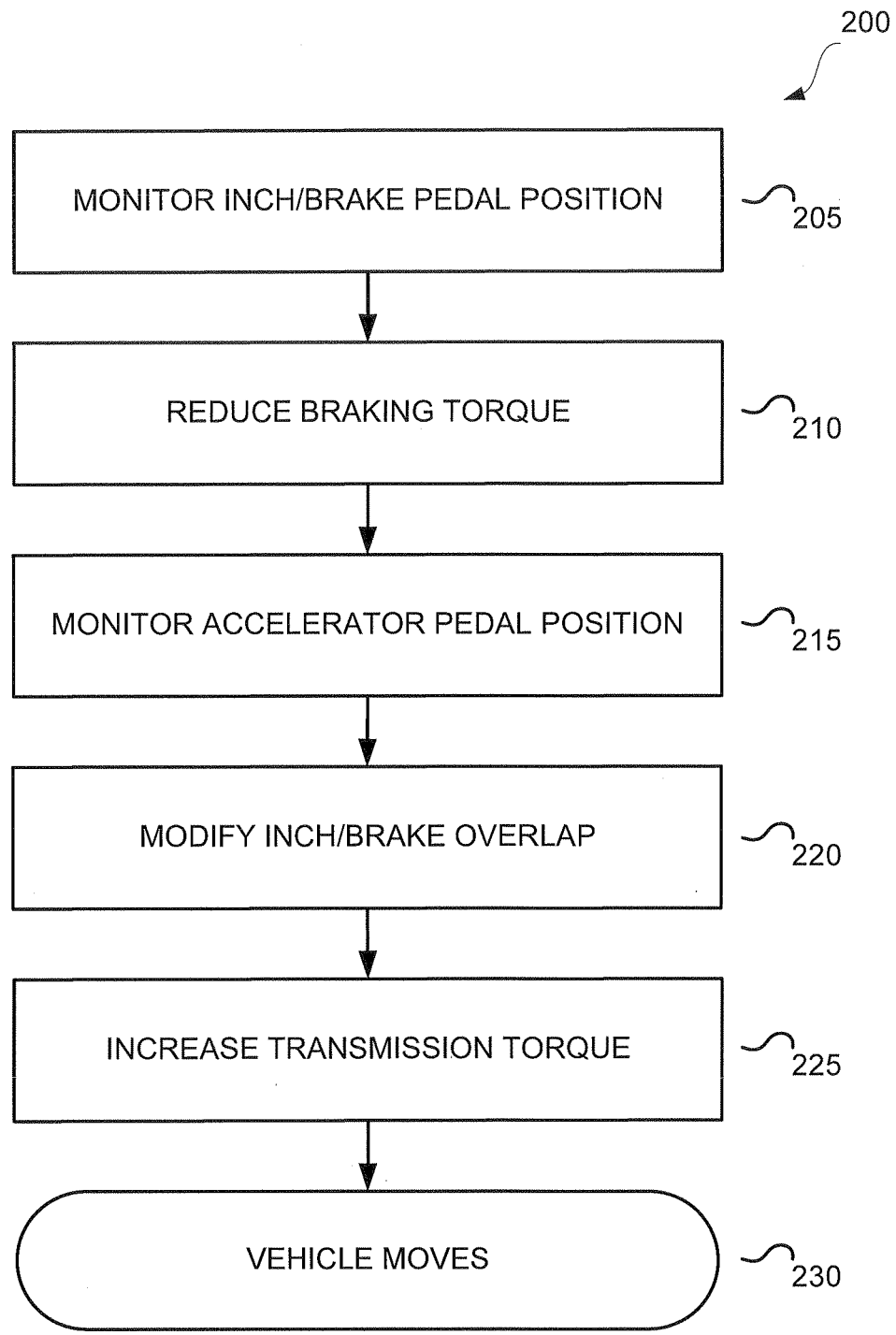
FIG. 10 illustrates an example method of operation for providing inching control including a dynamically adjustable inch/brake overlap.

FIG. 10 illustrates an example method of operation 200 for providing inching control including a dynamically adjustable inch/brake overlap. At operation 205, an inch/brake device input (e.g. inch/brake pedal position) is monitored. The inch/brake device input may indicate a braking position. At operation 210, a vehicle braking torque is reduced according to the inch/brake device input.

At operation 215, an accelerator input (e.g. accelerator pedal position) is monitored. The accelerator input may indicate a first accelerator position and a second accelerator position. The level of transmission torque associated with the braking position may be zero when the accelerator input indicates the second accelerator position.

At operation 220, an inch/brake overlap region is modified according to the accelerator position input, wherein the inch/brake overlap region is associated with simultaneous engagement of both a transmission system and a vehicle braking system. The transmission system may be initially engaged for different inch/brake device input values according to the accelerator input.

In one embodiment a level of transmission torque associated with the braking position is increased when the accelerator input indicates the first accelerator position. A level of transmission torque associated with the braking position may be decreased when the accelerator input indicates the second accelerator position. A transmission torque curve associated with the transmission system may vary depending if the inch/brake device input is increasing or decreasing in value.

When the transmission torque associated with the engagement of the transmission system is greater than the vehicle braking torque, the vehicle begins to move (operation 230). In one embodiment, the transmission torque provided during the inching operation varies as a function of both the inch/brake device input and the accelerator input.

Figure 11:
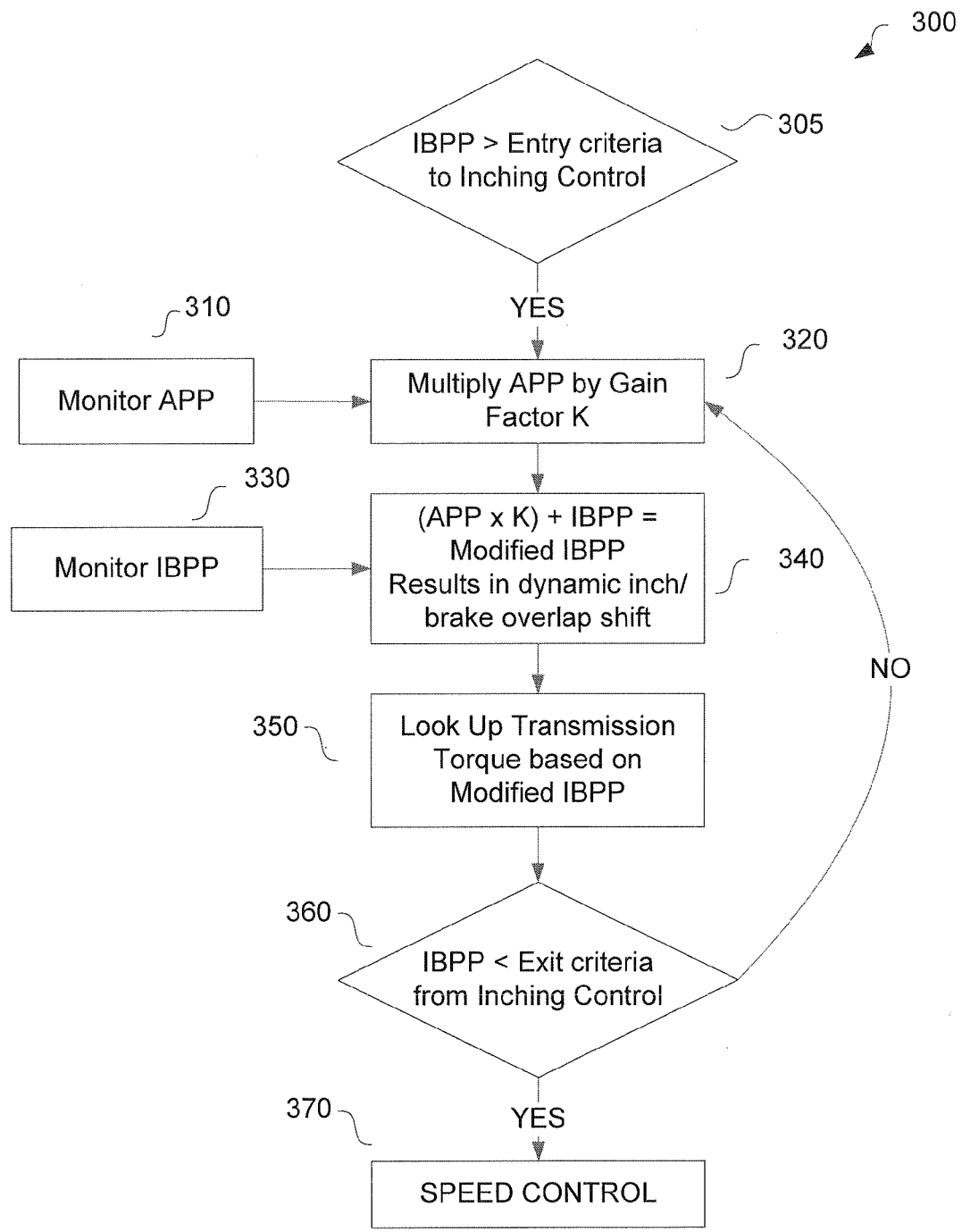
FIG. 11 illustrates an example method of an inching control system with dynamic inch/brake overlap.

FIG. 11 illustrates an example method of an inching control system 300 with dynamic inch/brake overlap. At operation 305, an inch/brake pedal position that exceeds an entry criteria (e.g. minimum threshold value) initiates an inching control operation or functionality.

At operation 310, a speed input (e.g. accelerator pedal position) is monitored. The speed input may indicate a range from a first accelerator pedal position to a second accelerator pedal position.

At operation 320, the speed input is multiplied by a gain factor K. This gain factor enables tuning of the inching control system 300 to accommodate combinations of different brakes and power trains providing the desired dynamic inch/brake overlap response.

At operation 330, a clutch input (e.g. inch/brake pedal position) is monitored. The clutch input may indicate a transmission torque value or range of values. A change in clutch input value may indicate an increase or decrease in transmission torque. The change in clutch input value may further indicate an increase or decrease in braking torque. Clutch input is associated with a torque curve.

At operation 340, the effective position of the inch/brake pedal is shifted according to the speed input and gain factor. This may result in a dynamic shift or modification of the torque curve. The dynamic shift may operate to increase the inch/brake overlap associated with simultaneous engagement of both a transmission system and a vehicle braking system as the speed input is increased (e.g. the accelerator pedal is pressed). The transmission system may be initially engaged for different inch/brake device input values according to the speed input.

At operation 350, the transmission torque corresponding to the modified torque curve for the shifted inch/brake pedal position is looked up or otherwise determined. The corresponding transmission torque may then be commanded.

At operation 360, the clutch input is monitored to determine if the system 300 should exit from inching control and return to speed control. In one embodiment, the system 300 exits from inching control when the inch/brake pedal has been released to a predetermined position or angle. If the clutch input remains greater than the predetermined value, then the system 300 returns to operation 320.

By providing a vehicle with dynamic control of how much inch/brake overlap is available for any operation or job function requiring fine position control (e.g. inching) of a vehicle, vehicle operation is improved. For example, one or more of the embodiments described herein may be configured to:

Enable a vehicle to start moving up hill from a stop on a grade without rolling downhill.

Reduce excessive overlap between transmission torque and braking torque, thereby reducing system heat, increasing fuel economy, and increasing service life of truck components.

Provide for fine traction control of the truck for very small movements.

Provide an intuitive method to dynamically change the amount of inch/brake overlap, thus reducing operator training and increasing productivity.

The system and apparatus described above can use dedicated processor systems, micro-controllers, programmable logic devices, or microprocessors that perform some or all of the operations. Some of the operations described above may be implemented in software and other operations may be implemented in hardware. It is further understood that computer-readable medium having instructions stored thereon may be provided, wherein when the instructions are executed by at least one device, they are operable to perform some or all of the operations.

Where specific numbers are provided, they are given as examples only and are not intended to limit the scope of the claims. The relationship between inputs and outputs of the various operations, computation, and methods described herein may be established by algorithms or by look up tables contained in processor memory.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An inching control system, comprising:
an accelerator pedal position (APP) sensor;
an inch/brake pedal position (IBPP) sensor; and
a vehicle processor, wherein the vehicle processor is configured to:
selectively engage a transmission system or a vehicle braking system according to input received from the IBPP sensor; and
vary an amount of transmission engagement force associated with a single vehicle braking force value in an inch/brake overlap region of the inching control system over a period of time according to input received from the APP sensor, wherein the amount of transmission engagement force is varied while maintaining a constant engine speed over the period of time.

2. The inching control system according to claim 1, wherein both the transmission system and the vehicle braking system are simultaneously engaged within the inch/brake overlap region.

3. The inching control system according to claim 1, wherein only one of the transmission system or the vehicle braking system is engaged when the inching control system is outside of the inch/brake overlap region.

4. The inching control system according to claim 1, wherein the inch/brake overlap region is largest when the input received from the APP sensor indicates a request for maximum vehicle speed.

5. The inching control system according to claim 4, wherein the inch/brake overlap region is smallest when the input received from the APP sensor indicates a request for zero vehicle speed.

6. The inching control system according to claim 5, wherein the inch/brake overlap region indicates an underlap when the input received from the APP sensor indicates the request nest for zero vehicle speed, and wherein neither the transmission system nor the vehicle braking system are engaged when the inch/brake overlap region indicates the underlap.

7. The inching control system according to claim 1, wherein the inch/brake overlap region varies according to the input received from the APP sensor.

8. A method, comprising:
monitoring, by a vehicle processor, an inch/brake device input;
reducing, by the vehicle processor, a vehicle braking torque according to the inch/brake device input;
monitoring, by the vehicle processor, an accelerator input; and
modifying, by the vehicle processor, an inch/brake overlap region according to the accelerator input, wherein the inch/brake overlap region is associated with simultaneous engagement of both a vehicle transmission system and a vehicle braking system, and wherein modifying the inch/brake overlap region comprises varying a level of transmission torque over a period of time while maintaining a constant engine speed over the period of time.

9. The method according to claim 8, wherein the inch/brake device input indicates a braking position, and wherein the accelerator input indicates a first accelerator position and a second accelerator position, and wherein varying the level of transmission torque comprises:
increasing the level of transmission torque associated with the braking position when the accelerator input indicates the first accelerator position; and
decreasing the level of transmission torque associated with the braking position when the accelerator input indicates the second accelerator position.

10. The method according to claim 9, wherein the level of transmission torque is zero when the accelerator input indicates the second accelerator position.

11. The method according to claim 8, further comprising:
beginning an inching operation when the level of transmission torque associated with the engagement of the vehicle transmission system is greater than the vehicle braking torque.

12. The method according to claim 11, wherein the level of transmission torque provided during the inching operation varies as a function of both the inch/brake device input and the accelerator input.

13. The method according to claim 8, wherein the level of transmission torque associated with the vehicle transmission system is varied as a function of the inch/brake device input.

14. The method according to claim 8, wherein the vehicle transmission system is initially engaged for different inch/brake device input values according to the accelerator input.

15. An apparatus, comprising:
means for monitoring a first input associated with an inch/brake device;
means for reducing a vehicle braking torque according to the first input;
means for monitoring a second input associated with an accelerator device; and
means for modifying an inch/brake overlap region according to the second input,
wherein the inch/brake overlap region is associated with simultaneous engagement of a vehicle transmission system associated with a first range of motion of the inch/brake device and a vehicle braking system associated with a second range of motion of the inch/brake device, and wherein the means for modifying an inch/brake overlap region comprises varying a level of transmission torque associated with the vehicle transmission system over a period of time while maintaining a constant engine speed over the period of time.

16. The apparatus according to claim 15, wherein the vehicle braking system and the vehicle transmission system are simultaneously engaged when the first and second ranges of motion of the inch/brake device overlap.

17. The apparatus according to claim 16, wherein there is no overlap between the first and second ranges of motion of the inch/brake device when the second input indicates a request for zero speed.

18. The apparatus according to claim 16, wherein the first and second ranges of motion of the inch/brake device overlap when the second input indicates a request for non-zero speed.

19. The apparatus according to claim 15, wherein the level of transmission torque varies with an amount of overlap, and wherein a braking force associated with the vehicle braking system remains constant, for a single position of the inch/brake device.

20. The apparatus according to claim 15, wherein the vehicle transmission system comprises a power-shift transmission.

* * * * *

UNITED STATES PATENT AND TRADEMARK OFFICE
CERTIFICATE OF CORRECTION

| | | |
|---|---|---|
| PATENT NO. | : 8,775,039 B2 | Page 1 of 1 |
| APPLICATION NO. | : 12/268615 | |
| DATED | : July 8, 2014 | |
| INVENTOR(S) | : Chen et al. | |

It is certified that error appears in the above-identified patent and that said Letters Patent is hereby corrected as shown below:

In the Claims

Column 14, line 27, in Claim 6, after "request" delete "nest".

Signed and Sealed this
Third Day of March, 2015

Michelle K. Lee
*Deputy Director of the United States Patent and Trademark Office*